United States Patent [19]
Pritt et al.

[11] Patent Number: 5,390,333
[45] Date of Patent: Feb. 14, 1995

[54] SWITCH ARRAY POWER REDUCTION APPARATUS

[75] Inventors: Harley P. Pritt, Rockwall; Michael A. Zeeff, Richardson; Paul A. Littlewood, Plano, all of Tex.

[73] Assignee: Alcatel Network Systems, Inc., Richardson, Tex.

[21] Appl. No.: 963,507

[22] Filed: Oct. 20, 1992

Related U.S. Application Data

[63] Continuation of Ser. No. 475,597, Feb. 6, 1990, abandoned.

[51] Int. Cl.6 .............................................. G06F 1/32
[52] U.S. Cl. ...................... 395/750; 395/425; 365/227; 364/948.91; 364/DIG. 2
[58] Field of Search ............... 395/750, 425, 725, 325, 395/550, 400; 365/189.04, 227; 370/68, 58.1, 111; 364/273.1, 273.5, DIG. 1, 942, 948.8, 948.91, DIG. 2, 707

[56] References Cited

U.S. PATENT DOCUMENTS

| | | | |
|---|---|---|---|
| 4,151,611 | 4/1979 | Sugawara et al. | 365/227 |
| 4,333,143 | 6/1982 | Calder | 364/200 |
| 4,388,687 | 6/1983 | Twibell et al. | 364/200 |
| 4,428,063 | 1/1984 | Fourcade | 364/900 |
| 4,442,485 | 4/1984 | Ota et al. | 364/200 |
| 4,520,479 | 5/1985 | Grima et al. | 370/84 |
| 4,599,689 | 7/1986 | Berman | 364/200 |
| 4,811,332 | 3/1989 | Carse | 370/58 |
| 4,901,283 | 2/1990 | Hanbury et al. | 365/222 |
| 4,937,820 | 6/1990 | Kawula | 370/111 |
| 4,972,407 | 11/1990 | Kawai | 370/68 |
| 5,014,268 | 5/1991 | Tyrell et al. | 370/68 |
| 5,148,546 | 9/1992 | Blodgett | 395/750 |

*Primary Examiner*—Jack B. Harvey
*Assistant Examiner*—Glenn A. Auve
*Attorney, Agent, or Firm*—Baker & Botts

[57] ABSTRACT

In a multinode switch array, the maximum number of nodes that can be passing data from input to output lead can be no greater than the number of output leads in the array. Thus, the remaining nodes, while not performing a useful switch function, when implemented in CMOS (complementary metal oxide semiconductor), are consuming power due to changing logic levels in the circuitry and are causing the input data drivers to consume power due to the loading effect of the non-functional but actively connected nodes. The present invention overcomes these prior art disadvantages by ascertaining from the indirect address data stored in connect memory of each node, the times that the traffic memory needs to be activated and deactivates the memory and any associated driver at all other times in a manner such that it and the data driver are not consuming power incurred by data transfer operations.

7 Claims, 2 Drawing Sheets

SWITCH ARRAY POWER REDUCTION APPARATUS

RELATED APPLICATIONS

This application is a continuation of application Ser. No. 07/475,597, filed Feb. 6, 1990, entitled "Switch Array Power Reduction Apparatus" by Harley P. Pritt, Michael A. Zeeff and Paul A. Littlewood, now abandoned.

THE INVENTION

The present invention is generally concerned with electronics and more specifically is concerned with the power consumption of electronic switch arrays. Even more specifically, the present invention is concerned with reducing power consumption in data drivers supplying data to matrixed memory switch arrays and reducing power consumption in the traffic memory portion of the individual nodes of the switch array that are not being used at any moment in time for transferring data.

BACKGROUND

In the prior art, the typical design of a matrix time slot interchange switch having rows and columns of switch nodes was to, as an example, and during a write operation, to write data to the traffic RAM in each of the nodes even though data would be read from only a small number of those nodes so as to be output from the switch array. As an example, in a non-blocking switch array with eight input leads and eight output leads (8×8), only one-eighth of the nodes could be engaged in data transfer at any instant. Although many prior art memory chips use the same amount of power whether or not they are receiving data, these memory types are very power hungry and dissipate a lot of heat to the environment. CMOS (complementary metal oxide semiconductor) memory chips are thus a preferred type of memory where power dissipation is a concern. CMOS chips not only dissipate (consume) power as a function of the voltage levels of the incoming data but also as a function of the internal capacitance of the data receiving portion of the chip and the frequency of the incoming data. Thus, a CMOS chip operates in a standby mode with very little internal consumption of power but causes the dissipation of relatively large amounts of power when receiving data. This power consumption increases proportionally with the frequency of data transfer. Thus, in a CMOS environment using prior art design approaches for an 8×8 matrix, the other seven-eighths of the nodes not only are needlessly dissipating internal power while receiving data, but in addition, are loading down the data driver and thus, causing the data driver to dissipate needless power. The dissipation of the energy by the memory nodes not being used, limits the size or density of a matrix that can be used, and additionally, in many applications, causes needless additional energy to cool the environment surrounding the switch array in an attempt to keep it within design temperature parameters.

This problem is overcome by the present invention in one or both of two ways. The typical prior art design for each node within a switch array included a connect memory storage means which typically was serially addressed in a manner similar to the addressing of the traffic memory in the write mode. The connect memory was loaded with an indirect address defining the physical location in the traffic memory that data was to be read from during a data output read operation. The memory location into which this indirect address is loaded corresponds in time of access to the time slot that the data is to appear on the output bus. This memory location also contained a read enable bit so only one node outputs data to each output bus at a given time. If more than one node were to attempt to write to a bus, corruption of the data would occur due to conflicting logic levels. The present invention adds extra memory storage space to the connect memory for containing write enable bits which are utilized to enable further switches which activate the traffic memory only during those times that it is needed to write data which will be output by that node. These write enable bits, for a given piece of data, are typically stored in a different connect memory location corresponding in access time to the value of the indirect address. The design of the present switch incorporated a device driver for use in write operations as a part of each node. Thus, these same write enable bits, used to cause the reactivation of the memory chip, also unload any connected data drivers. If the chip design is such that deactivation of the memory does not automatically unload any connected data drivers, the same write enable bit may be used to operate further switches which will electrically disconnect the traffic memory from incoming data lines except when needed for a write operation.

The correct position (location) to store the write enable bit in connect memory can be deduced either using software or hardware from the value of the data used in the indirect addressing scheme of the prior art. The read enable bit is, as mentioned, and as was typically the case in the prior art, merely placed in the same or a comparable memory location to the indirect addressing data bit(s).

The present invention saves power by preventing logic bit value changes in the traffic memory except when a read or write operation is required for transferring data through that node and thereby reducing power consumption for the read operation, the write operation, and additionally disconnects the driver to reduce power consumption by the data driver. While the preferred arrangement shown provides a very large reduction in power dissipation, even implementing one of the write enable or device driver deactivation functions will still produce substantial power savings.

It is thus an object of the present invention to improve the power efficiency of a matrix switch array.

Other objects and advantages of the present invention will be apparent from a reading of the specification and appended claims in conjunction with the drawings wherein:

DETAILED DESCRIPTION

Figure 1:
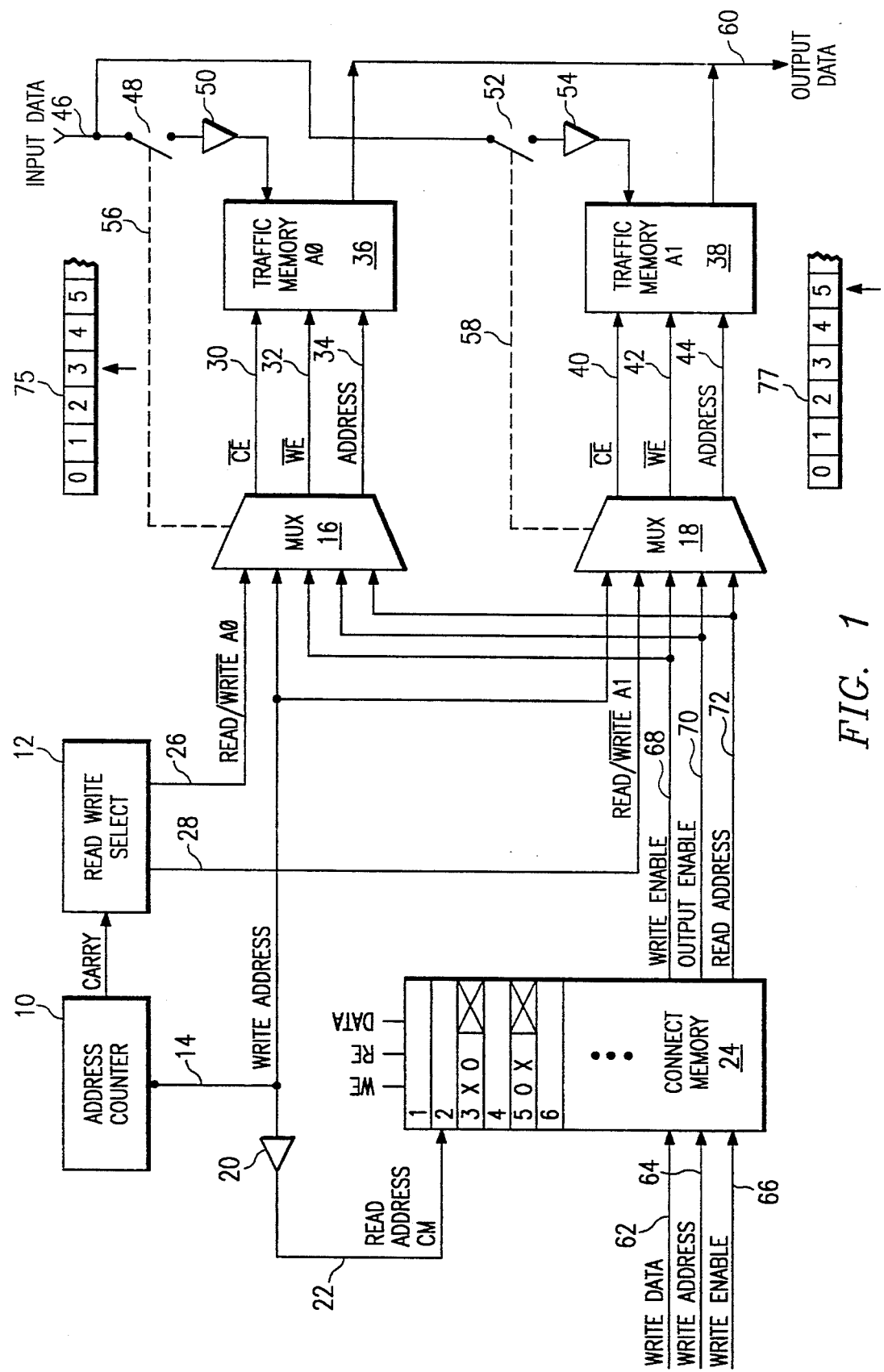
FIG. 1 is a block diagram of a single node of a switch array.

An address counter 10 in FIG. 1 is shown providing an output carry signal to a read/write select block 12. Address counter 10 also provides write address output signals on a lead 14 to a first mux 16 and a second mux 18. The write address signals on lead 14 are supplied through a buffer 20 and become read address signals for a connect memory as supplied on a lead 22 to a connect memory designated as 24. The read/write select block 12 provides first read/write signals on a lead 26 to mux 16 and provides a second set of read/write signals on a lead 28 to mux 18. The mux 16 provides chip enable, write enable and address signals on leads 30, 32 and 34, respectively, to a traffic memory block 36. Mux 18 provides similar signals to a traffic memory 38 on leads 40, 42 and 44, respectively. Input data from a bus is supplied on a lead 46 and passed through a switch 48 and a driver amplifier 50 to traffic memory 36. A similar switch 52 and driver amplifier 54 supplies the same data to traffic memory 38. A dash line 56 is shown operating switch 48 from mux 16. A similar dash line 58 is shown operating switch 52 from max 18. The dash lines 56 and 58 are shown as dash lines since, in some embodiments of traffic memories 36 and 38, the chip enable signals will also manipulate internal switches ahead of data input drivers. Thus, for some versions of traffic memory, external switches such as shown would not be required to minimize driver power consumption. Traffic memories 36 and 38 supply signals to an output data lead 60. The connect memory 24 receives input data on a lead 62 with address information received on a lead 64 and an enabling signal received on lead 66 for writing the data received on lead 62 at the address supplied on lead 64. Connect memory 24 supplies write enable signals on a lead 68 to both the muxes 16 and 18, and output enable signals on a lead 70 to both of the muxes 16 and 18. Finally, read addresses are supplied on lead 72 from connect memory 24 to both of the muxes 16 and 18. In the top part of connect memory 24, there are shown the first six address places from one to six for a simplified illustration of how data received on lead 46 in the third time slot position can be output on line 60 in the fifth time slot position. The third time slot position is shown by a time related display of data illustrated as a time related block 75 and the output data is shown with its relative time slot position in a time related block 77.

Figure 2:
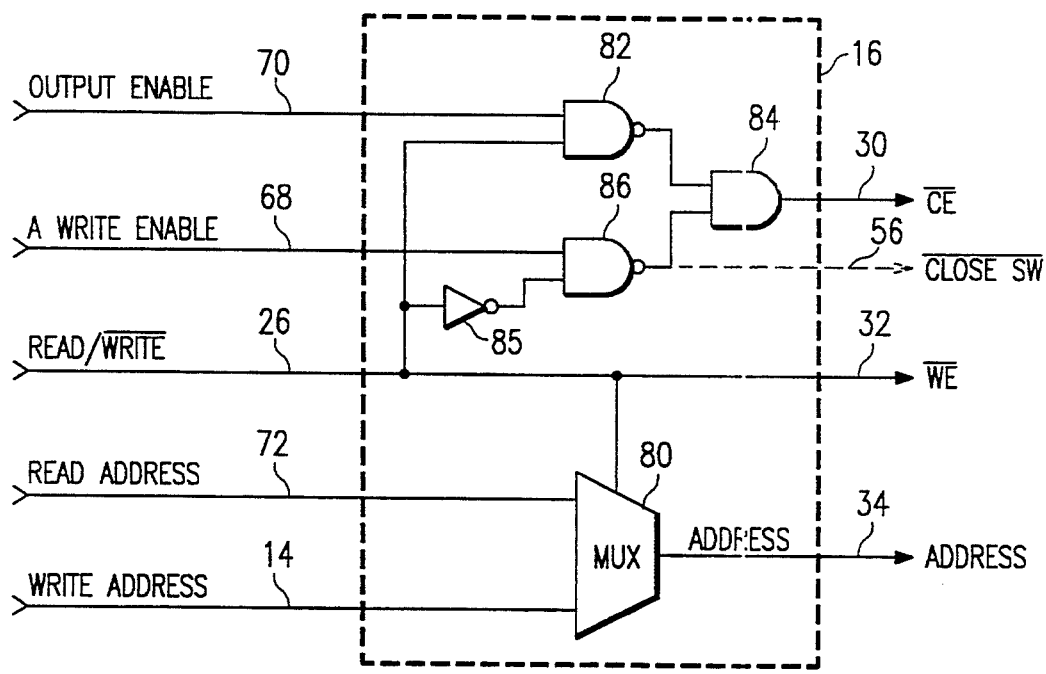
FIG. 2 is a more detailed illustration of a multiplex switch used in FIG. 1 in implementing the present concept.

In FIG. 2 the same designators are used as in FIG. 1 assuming the upper mux and traffic memory is to be used as an example. FIG. 2 merely amplifies the contents of both muxes 16 and 18. Within mux 16 a further multiplexing block labeled 80 is shown receiving the inputs of read address and write address on lines 72 and 14 and outputting an address on lead 34 to traffic memory. The read/write signal supplied on lead 26 is used to switch the mux 80 between outputting as an address either the read address or the write address depending upon the logic level of read/write lead 26. This lead 26 passes unaltered to output 32. The read/write lead input is also supplied to a NAND gate 82 and through an inverter 85 to a NAND gate 86. The write enable lead 68 is supplied to the other input of NAND gate 86 while the output enable lead 70 is supplied to the other input of NAND gate 82. The outputs of the two NAND gates 82 and 86 are supplied to an AND gate 84. An output of AND gate 84 is supplied as the chip enable lead 30.

The prior art mux 16 included all the circuitry shown except for the lead 68 and the NAND gate 86. In other words, the traffic memory was only activated for read or output operations in accordance with a data bit supplied along with the indirect address supplied to connect memory for addressing the traffic memory 36. On the other hand, whenever the read/write line 26 was in the write mode, the traffic memory 36 was activated for the full time that data could be input. The reason for this was that not only did prior art-type memory devices not save power by selective deactivation at write data times, but there was not an obvious algorithm in which it could be ascertained how to turn ON the traffic memory only during the times that data would be selectively received for output.

Figure 3:
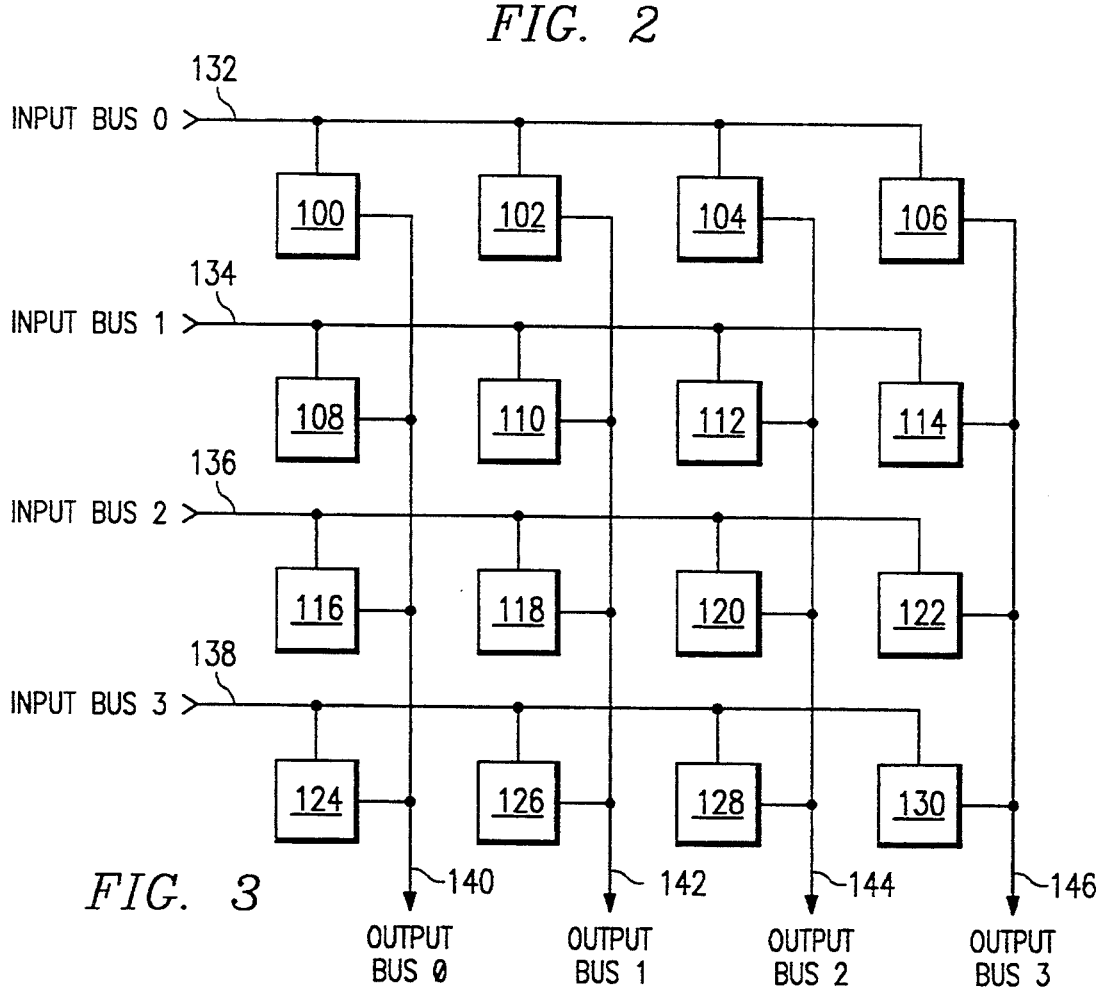
FIG. 3 illustrates a switch array of the matrixed memory configuration wherein the present invention would find use.

In FIG. 3 a plurality of sixteen blocks are shown numbered from 100 to 130 wherein an input lead 132 supplies signals to each of blocks 100 to 106 and a second input bus supplies signals on lead 134 to blocks 108 to 114. A lead 136 supplies inputs to each of blocks 116 to 122 and input bus 138 supplies inputs to all of blocks 124 to 130. A first output lead 140 can selectively receive signals from one of blocks 100, 108, 116 and 124. A second output bus 142 is connected to selectively receive outputs from blocks 102, 110, 118 and 126. The remaining leads 144 and 146 are connected to the remaining blocks as shown. Each of the blocks from 100 to 130 comprise a node in a switch matrix and contain the contents illustrated as FIG. 1. The input lead in each case would be comparable to lead 46 and the output leads would be comparable to lead 60 of FIG. 1. FIG. 3 thus illustrates a 4×4 non-blocking switch matrix or array.

OPERATION

As briefly referenced previously, the operation of a majority of the circuitry shown in the circuits of FIGS. 1 and 2, is identical to the prior art. The address counter 10 is a serial and cyclical counter which provides a series of addresses and then starts over again. These addresses form write addresses which are supplied to one of the two traffic memories 36 and 38 for writing in data from the input line 46 while simultaneously providing write addresses through buffer 20 to connect memory 24 which accesses a plurality of address locations within block 24. These read address locations contain an indirect address to traffic memory. Thus, if data is being written to memory 36, it is simultaneously being read from memory 38 if enabled also by output enable lead 70. The read/write leads 26 and 28 have opposite polarities so that they provide a logical indication to the two memories as to which one is to read and which is to write at any given point in time. While there is only one address input on each of the memories 36 and 38, the mux 80, within block 16 of FIG. 2, is also connected to the read/write signal received from select block 12 and thus, chooses whether the read address and write address inputs are received by the specific traffic memory.

The information in the connect memory is changed seldom compared with the read/write cycles of the traffic memory in 36 and 38. The reason for having two traffic memory blocks is that one is filling up with data while the other is writing out data to the output and the read address output from connect memory merely defines the read address of whichever traffic memory is being used for outputting data at that moment. While all of the data bits in a given address location, as defined by the read address in 22, are supplied to both traffic memories, the read enable bit (which passes unaltered to output enable line 70) and the data bits only affect the traffic memory block which is being read from at the moment and the write enable bit (whether logic "0" or logic "1") in that connect memory location affects the other traffic memory block due to the logic within circuitry of FIG. 2. The data bits in a given address location within connect memory 24, as defined by read address 22, are applied to only that traffic memory in the read cycle as controlled by leads 26 and 28. The traffic memory in the write cycle, as defined by 26 and 28, has the write address (14) applied.

For purposes of discussing the operation, it will be assumed that traffic memory 36 is to receive data appearing in the third time slot as shown by the time slot in block 75. The memory location 3 in connect memory 24 will be accessed at a time coincident with the appearance of data on input lead 46 corresponding to the third time slot of block 75. Within the data portion of connect memory 24 for memory location 5, an indirect address corresponding to address 3 in either of the traffic memories will appear. In the prior art, the normal operation would be that data in time slot 0 of data lead 46 would be written in location 0 of traffic memory 36, then immediately thereafter, due to the change in address from address counter 10, location 1 would receive the data of time slot 1, location 2 would receive the data of time slot 2, and so forth, so that every time data appeared at the input, data would be written in a different location in memory 36. Then, if any of the data was to be output on lead 60, the address in the data section of connect memory 24 defines the location from which it is to be read. If there is a logic 1 (shown as an X) for the read enable bit, then data should be read. If there is a logic 0 for the read enable bit, then the data would not be read. This feature was built into the prior art because there could be interaction if two or more memories tried to output on a single line, such as line 140 of FIG. 3. For example, if two of the memories 100 and 108, output a logic 0 at a given point in time, and the other two memories 116 and 124 output a logic 1, the output 140 would be indeterminate. Thus, a tri-state memory needed to be provided to the memory elements so that there was either a logic 0, a logic 1, or a neutral (disconnected) condition. The specific piece of data in question is written into memory location 3 of block 36, it is being read out of memory location 3 in memory 36 during time slot 5 as depicted by the time slot presentation 77. This writing occurs because of the X in memory location 3 of connect memory 24 coincident with the write enable (WE) set of data bits. Later, at time slot 5, the third location in traffic memory 36 is addresssed due to the value in the data section of connect memory 24, and the data is output at the proper time on lead 60. The write enable in memory location 3 activates traffic memory 36 so that it can accept data bits. This can be accomplished either by a write enable directly to the traffic memory 36, or via the dash line 56 which opens and closes a switch 48 or its counterpart 52 for traffic memory 38, to not even present data except during the times set forth by the write enable bits in connect memory 24.

As previously suggested, this minimizes power dissipation in the memory 36 since the power utilized by CMOS memory is a direct function of the frequency of change of logic levels of the complementary memory storage circuitry within the chip. Thus, if it memory 36 only receives one set of data per cycle of the address counter 10 rather than 128 sets of data as might be typical in one prior embodiment, the power usage during writing by memory element 36 might be reduced to as much as 1/100. The total memory use reduction in a 4×4 array such as shown in FIG. 3, was found to drop to one-quarter of that previously used with the prior art approach of deactivating the traffic memory only for the read cycles and not for the write cycles.

There is energy involved in converting an incoming signal to a power level sufficient to be stored in memory. By removing the incoming driver such as 50 from even being activated by incoming signals, a further power reduction, over that of not manipulating the complementary symmetry circuitry within memory 36, is also achieved.

As previously indicated, the circuitry of FIG. 2 is very similar to that of the prior art and merely involves the addition of NAND gate 86 and the write enable input lead 68. In other words, an input to AND gate 84 would be such that a signal on read/write line 26 would cause the traffic memory to store incoming data during the entire write cycle. While the circuit implementation may be very simple, the concept of inserting an additional storage bit (WE) in the connect memory 24 in a position defined by the indirect memory addressing data in a different memory location to be used to actuate the NAND gate 86 is believed unobvious and of patentable significance.

In summary, our inventive concept is believed to involve deactivating data storage reception in traffic memory to save power except during those times that data being received is to be later used as an output from that memory node. This is different from the prior art approach of receiving all data presented on an input line and outputting data selected by an indirect address in connect memory. The selective storage of data, as presented by the present concept, is achieved by using the indirect addressing information and activating the traffic memory during its write cycle only for those times corresponding to the indirect addressing information. A preferred embodiment, as disclosed by the present invention, accomplishes this by adding an extra memory bit in a write enable location of connect memory and this write enable bit is used to activate the chip enable input of the traffic memory chip. This function may be achieved by software at a remote location or hardware in each node that is specifically used to detect the indirect memory addresses stored within block 24 and activate either the chip memory 36 or a remote switch such as 48 and 52 at the appropriate times so that data is only provided to the memories 36 and 38 at times appropriate to receive only the information appearing on lead 46 that is to be eventually output on lead 60.

While we have presented the specific preferred embodiment of the inventive concept, we wish to be limited not by that approach but only by the scope of the appended claims wherein we claim:

1. A method for reducing power consumption in a switched matrix array memory system having a plurality of input lines, where each input line is connected to a row of addressable multiple storage location data memory element nodes in the switch matrix array, and a plurality of output lines, where each output line is connected to a column of data memory element nodes in the switch matrix array, and where each memory element node includes, in addition to traffic memory, a connect memory used to store memory addresses for indirectly addressing data to be output at given time slots of a system clock to transfer data between specific ones of said plurality of input and output lines, the method comprising the steps of:

enabling only specific nodes of said traffic memory to receive data for storage only at times coincident with an appearance on an input line of a value corresponding to an indirect address for said only specific nodes stored in said connect memory, said only specific nodes enabled for writing data into time serially addressed locations of said traffic memory; and enabling only specific nodes of said traffic memory to output stored data only at times corresponding to a time of access of the connect memory indirect addresses for outputting data to said output lines.

2. A plain method for minimizing power requirements of a multinode matrixed switch array where each node in the array is used for data transfer only a percentage of the time, said method comprising the steps of:

activating a write enable data bit in a connect memory portion for each node at an address location in the connect memory where time of access corresponds to given indirect addressing data in the connect memory;

activating a read enable data bit in the connect memory portion for each node at an address location in the connect memory where time of access corresponds to the address in connect memory to which said given indirect addressing data is supplied;

sequentially activating each of the address locations in said connect memory for supplying write enable signals to store incoming data into each node at only those times coincident with the activation of a write enable data bit; and sequentially activating each of the address locations in said connect memory for supplying read enable signals to output data from each node at only those times coincident with the activation of a read enable data bit.

3. A method for activating only those nodes of a multinode matrixed switch array presently being used for data transfer between the nodes and associated data lines, said method comprising the steps of:

setting a first data transfer enable bit in an addressable connect memory portion of each node at a time sequentially accessed location in said connect memory in response to indirect addressing data being supplied to said connect memory;

setting a second data transfer enable bit in said connect memory portion of each node at an address location in connect memory, where time of access corresponds to the address in connect memory to which said given indirect addressing data is supplied;

enabling data transfer in a traffic memory portion of each node when either said first or second data transfer enable bit is supplied thereto; and sequentially activating each address location in said connect memory whereby said traffic memory is data transfer enabled only during those times it is (a) to output data, and (b) to receive data for outputting.

4. Apparatus for use as a node in a multiple line input/multiple line output matrixed memory switch array, said apparatus comprising, in combination:

data supply input line first means for supplying time multiplexed data;

time multiplexed data output line second means for outputting at least some of the data appearing on said first means;

traffic memory third means, including data input and data output means connected to said first and second means respectively, said third means also including first enable signal input means for rendering said third means to a condition whereby it can read or write data, second enable signal input means for placing said third means in one of read/write modes, and address signal input means for defining the memory location within said third means that a read/write action will take place;

connect memory fourth means, including read address and write address input means, connected to said first enable signal input means of said third means for only enabling said third means to receive data, while said third means is in a write mode, that is scheduled to be output from said third means when said third means is in a read mode; and address counter fifth means, connected to said fourth means and to said third means, for supplying sequentially occurring addresses thereto on a periodic basis.

5. A node apparatus for use in a switch array apparatus comprising, in combination:

data supply input line first means for supplying time multiplexed data from a data source;

traffic memory second means for storing the time multiplexed data from said first means, said second means including data input and data output means and address signal input means, said address signal input means for defining a memory location within said second means that a read/write action will take place;

time multiplexed data output line third means, connected to said second means, for outputting data received by said second means from said first means and stored in said second means;

connect memory fourth means, connected to said third means, for preventing signal loading of the data source supplying data to said first means, except when an enabling bit stored in said connect memory is accessed as part of a periodic addressing scheme; and address fifth means, connected to said fourth means and to said third means, for supplying cyclically recurring addresses to said third and fourth means.

6. A method of preventing redundant data storage in a switch array by downloading data to traffic memory in only those nodes of a multinode matrixed switch array presently being used for data transfer, said method comprising the steps of:

setting an enable bit in an addressable connect memory portion of each node at a time sequentially accessed location in said connect memory, said time sequentially accessed location corresponding to indirect addressing data supplied to said connect memory and normally stored in a different location in said connect memory than said data;

enabling receipt of data by traffic memory of each node when said enable bit is accessed; and cyclically accessing each address location in said connect memory.

7. A method for reducing power consumption in a switched matrix array traffic memory system having a plurality of input lines, where each input line is connected to a row of addressable multiple storage location data memory element nodes forming the switch matrix array and a plurality of output lines, where each output line is connected to a column of data memory element nodes in the switch matrix array, and where each memory element node includes, in addition to traffic memory, a connect memory used to store memory addresses for indirectly addressing data to be output at given time slots of a system clock to transfer data between specific ones of said plurality of input and output lines, comprising the steps of:

enabling only specific nodes of said traffic memory to receive data for storage only at times coincident with an appearance on an input line of a value corresponding to an indirect address for said only specific nodes stored in said connect memory for writing data into time serially addressed locations of the traffic memory, individual nodes of the traffic memory not being enabled thereby each consuming less power than one of said only specific nodes that is enabled at any given time;

enabling said traffic memory to output stored data only at times corresponding to time of access of the connect memory indirect address values for outputting stored data to said output lines.

* * * * *